Oct. 1, 1963  G. V. JONES  3,105,909
BATTERY BOOSTER
Filed Aug. 17, 1961
FIG. 1
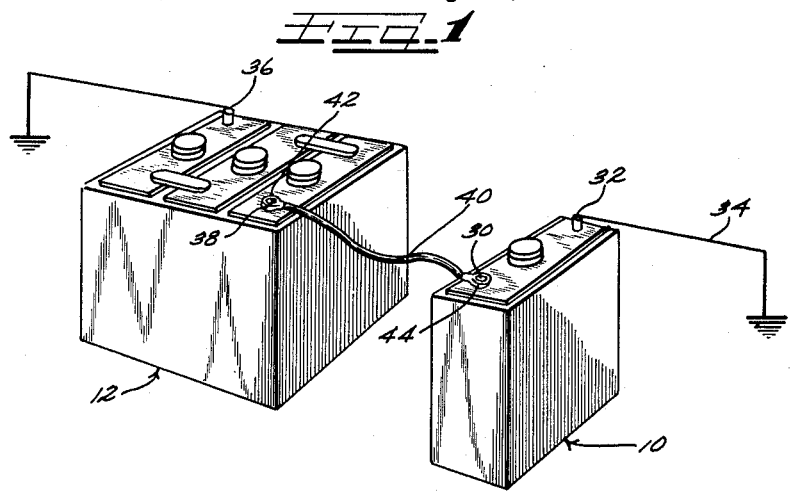
FIG. 2
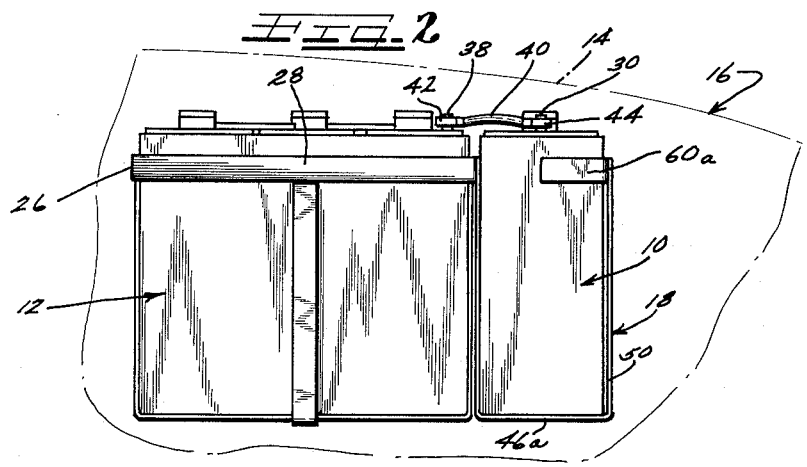
FIG. 4
FIG. 3
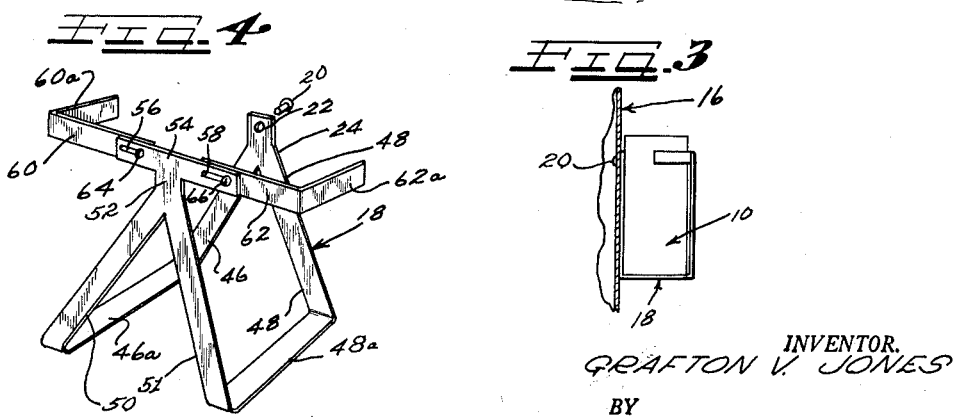
INVENTOR.
GRAFTON V. JONES
BY
ATTORNEYS

United States Patent Office 3,105,909
Patented Oct. 1, 1963

3,105,909
BATTERY BOOSTER
Grafton V. Jones, 208 S. 1st St., Amite, La.
Filed Aug. 17, 1961, Ser. No. 132,217
1 Claim. (Cl. 307—10)

This invention relates to a battery booster construction, and more particularly to such a construction as utilized with automobile batteries and the like.

It is often found that cars using six volt batteries are slow in starting, so that the operator may have to buy an eight volt battery or the like in substitution for the original battery. Also, there has been experienced considerable difficulty in starting twelve volt automotive battery systems, particularly with installations where air conditioning, power windows and the like are used, as well as with cars employing butane gas.

The present invention resolves the foregoing problems and difficulties by means of a booster construction utilized in combination with the car battery. In accordance with the invention, a smaller voltage battery is mounted in a rack according to the invention, and secured beneath the hood of the car by screw means engageable in the rack and with the frame or other construction in the car.

The booster battery used in the present invention may be a two volt, one cell booster battery, joined in series with the original car battery by means of a connector cable joining the positive post of the booster battery with the negative post of the original six or twelve volt battery for the car. The negative post of the booster battery is provided with a grounding lead, as will be understood.

Accordingly, it is an object of the present invention to provide a booster battery combination for batteries and automotive systems and the like wherein the booster battery as joined in series with the main battery affords a ready starting action without the necessity of substituting a large and expensive battery for the original battery.

Another object of the invention is to provide a booster battery construction as described which can be installed by using one screw and one cable, by means of a particular rack according to the invention.

Another object of the invention is to provide a booster battery construction which, when used in combination with twelve volt systems, renders such systems easy to start where conditions such as the provision of air conditioners, power windows, and truck and car motor systems using butane gas and the like would otherwise make starting difficult.

Another object of the invention is to provide a device as described which is readily mounted in the automobile by a particular rack for the device.

Another object of the invention is to provide a device and method as described which is simple, economical, and may be utilized without the need for special skills and techniques.

Other objects and advantages of the invention will become apparent as the description proceeds in accordance with the drawing in which:

FIGURE 1 is a perspective view of a booster assembly according to the present invention;

FIGURE 2 is a side elevational view of the structure shown in FIGURE 1 in combination with an automotive vehicle;

FIGURE 3 is a fragmentary view showing a different form of the structure shown in FIGURE 1; and FIGURE 4 is a perspective view of rack means for the booster battery of the invention.

Referring now to the drawings, a booster battery 10 is shown in accordance with the present invention in combination with an automotive battery 12 positioned beneath the hood 14 of an automotive vehicle generally designated by reference numeral 16. The booster battery 10 is supported in a rack 18, as hereinafter further described, and secured in the vehicle 16 by means of a screw 20 threadedly or otherwise extending through an opening 22 in a bracket extension 24 of the rack 18. Thus the booster 10 may be positioned in any desirable location in the automotive vehicle, and in the form shown in FIGURE 2 is secured to a rack 26 surrounding the battery 12 and having a strap 28 apertured for threaded connection with the screw 20 or otherwise (as by a nut element or the like). It will be understood that variation in the manner of connection for the rack 18 will be afforded within the scope of the invention, and in FIGURE 3, the rack is shown as being connected to the body of the vehicle 16.

The battery 10 is adapted to supplement the voltage of a conventional battery such as the battery 12 for an automotive vehicle, and the battery 12 for use in combination with the battery 10 may be, for example, a six volt battery or a twelve volt battery as understood by those skilled in the art. Thus the battery 10, in order to provide a desirable degree of boosting effect for the battery 12, in a preferred form of the invention constitutes a two volt, one cell battery. The battery 10 includes a positive post 30 and a negative post 32 grounded by a lead 34 connected to the car framework or otherwise as understood by those skilled in the art.

The battery 12 also has a positive post 36 and a negative post 38, and in order to connect the battery 10 in series to the battery 12, a connector cable 40 having suitable connecting ends 42 and 44 is connected between the posts 30 and 38.

Referring now to FIGURE 3, the rack 18 is constructed to securely receive a booster battery such as the battery 10, or booster batteries according to the invention having differing axial dimensions. To this end, the rack 18 includes a bifurcated bracket structure connected to the bracket extension 24 as indicated at 46 and 48 with the bifurcated bracket portions 46 and 48 respectively being joined integrally with bottom support portions 46a and 48a which are integrally connected to bifurcated bracket portions 50 and 51 joining a bracket extension 52 opposite the bracket extension 24. Thus the battery may be securely seated in the rack 18, and, in order to provide for possible variations in the booster battery size, the upper portion of the bracket extension 52 opposite the bracket portion 24 carries a T-shaped element 54 which is slotted at each end as indicated at 56 and 58. Retainers 60 and 62 having inwardly turned ends 60a and 62a are axially adjustably secured to the ends of the T-shaped element 54 by means of screws or the like 64 and 66 respectively received in the slots 56 and 58 and preferably engaged in suitable apertures or the like (not shown) in the axially extending portions of the retainers 60 and 62. Suitable nut elements (not shown) may also be connected to the respective screws 64 and 66.

It will be understood, of course, that variations in the particular shape of the rack 18 will be encompassed within the scope of the present invention, although the construction described, with a screw connection 20 mounted in a manner to centrally support stresses directed from the respective bracket extensions 46 and 48, and wherein the slidable connection for different sizes of batteries is accommodated on the opposite bracket portion 52, is particularly convenient and reliable.

It will thus be appreciated that I have provided a battery booster construction which is simple and effective and is adapted to assure starting capacity for either six or twelve volt batteries for cars, trucks and the like as well as in other applications of the type indicated where a small differential power assist may afford a great improvement.

Although I have herein set forth and described my invention with respect to certain specific principles and details thereof, it will be understood by those skilled in the art that these may be varied without departing from the spirit and scope of the invention as set forth and hereunto the appended claim.

I claim as my invention:

In a vehicle having a battery for engine starting and operation,
  a rack structure for supporting a booster battery in the vehicle comprising
    downwardly extending opposed bracket portions and a bottom support joining the downwardly extending opposed bracket portions,
    the bracket portions being spaced to snugly receive a booster battery therebetween,
  means on one of said bracket portions for securing the rack in supported relation on the vehicle,
  a pair of extensions having inwardly turned ends for engaging the ends of a booster battery and
  means securing the extensions adjustably in the other of the bracket portions to afford movement of the extensions toward and away from one another as desired and
  a two-volt, wet cell, rechargeable booster battery in said rack structure in series with the battery for engine starting and operation.

References Cited in the file of this patent

UNITED STATES PATENTS

| | | |
|---|---|---|
| 1,218,056 | Cole | Mar. 6, 1917 |
| 1,607,598 | Andrews | Nov. 23, 1926 |
| 1,677,789 | Mabey | July 17, 1928 |
| 1,773,920 | Mayforth | Aug. 26, 1930 |
| 1,934,588 | Butler | Nov. 7, 1933 |
| 2,257,155 | Bowers | Sept. 30, 1941 |
| 2,335,526 | Mitchell | Nov. 30, 1943 |
| 2,659,042 | Anderson et al. | Nov. 10, 1953 |